United States Patent [19]

Tsao

[11] Patent Number: 4,513,098
[45] Date of Patent: Apr. 23, 1985

[54] MULTIMETALLIC CATALYSTS AND THEIR METHOD OF PREPARATION FROM ORGANOMETALLIC PRECURSORS

[75] Inventor: Ying-Yen P. Tsao, Langhorne, Pa.

[73] Assignee: Mobil Oil Corporation, New York, N.Y.

[21] Appl. No.: 508,407

[22] Filed: Jun. 28, 1983

[51] Int. Cl.$^3$ .................. B01J 27/02; B01J 31/12; C10G 35/04; C10G 35/06

[52] U.S. Cl. .................. 502/216; 502/171; 502/219; 502/220; 502/221; 208/134; 208/136; 208/143; 208/112; 208/216 R

[58] Field of Search .............. 502/171, 216, 219, 220, 502/221

[56] References Cited

U.S. PATENT DOCUMENTS

| | | | |
|---|---|---|---|
| 3,635,761 | 1/1972 | Haag et al. | 117/227 |
| 3,996,130 | 12/1976 | Sergeevich et al. | 208/244 X |
| 4,059,608 | 11/1977 | Calas et al. | 423/324 X |
| 4,272,406 | 6/1981 | Beach et al. | 585/511 X |
| 4,407,729 | 10/1983 | Schumacher et al. | 502/219 X |
| 4,430,443 | 2/1984 | Seiver et al. | 502/220 |

*Primary Examiner*—William G. Wright
*Attorney, Agent, or Firm*—A. J. McKillop; M. G. Gilman; L. P. Hobbes

[57] ABSTRACT

Certain organometallic precursors selectively interact with surface hydroxyl groups on an inorganic oxide support such as silica, alumina or silica-alumina or to provide a uniform distribution of metal complexes on the surfaces of said support. Subsequent reduction of the support results in a high dispersion of uncomplexed metal centers to which other organometallic precursors are subsequently attached. The substantially attached organometallic precursors may be reduced and/or sulfided to yield a highly active hydrogenation catalyst having a plurality of metal species in a highly dispersed distribution.

9 Claims, No Drawings

MULTIMETALLIC CATALYSTS AND THEIR METHOD OF PREPARATION FROM ORGANOMETALLIC PRECURSORS

BACKGROUND OF THE INVENTION

Multimetallic catalysts, i.e. catalysts comprising two or more different metals on a substrate, have been found to be useful in many different processes. Among these are the reforming of petroleum naphthas to high-octane gasoline, isomerization, hydrocracking, desulfurization and hydrogenation.

Multimetallic catalysts are generally prepared by impregnating a high surface area carrier or substrate with an aqueous solution containing appropriate concentrations of the desired metals. A plurality of metals may be present within a single impregnating solution. Alternatively, a substrate may be contacted with a plurality of impregnating solutions, each containing only one metal component.

Conventional impregnation procedures have been found to suffer from an inability to evenly disperse metals throughout the catalyst surface. Consequently, it often becomes necessary to use excessive amounts of metal in the impregnating solution in order to produce a catalyst of optimal activity. Molybdenum-tungsten dehydrogenation catalysts may require metal loadings greater than 9 wt. percent molybdenum and 10 wt. percent tungsten when produced conventionally. Such high metal requirements often make the use of such catalysts economically unattractive.

Alternatives to conventional impregnation methods are known in the art. These methods comprise contacting a non-aqueous solution containing a metal pi-complex with a substrate having a catalytic surface capable of effecting deposition of said metal or metals from the complex thereon. The metal pi-complex can be deposited on the substrate by reducing the complex in the presence of the substrate by means of a reducing agent such as hydrogen gas. Such a method is described in U.S. Pat. No. 3,635,761 to Haag et al., incorporated herein by reference. The art also teaches a method of anchoring a molybdenum metal pi-complex to the surface hydroxyls present in a mixture of silica and alumina. The resulting catalyst material can then either be sulfided by the treatment with $H_2S$ or, reduced by treatment with hydrogen and then sulfided, or else oxidized and then sulfided. The treated catalyst contains about 2% by weight molybdenum and is found to be a more effective hydrodesulfurization catalyst than its conventionally impregnated counterpart, owing to a more even dispersal of metal, (see, Yermakov et al, Thiophene Hydrogenolysis on Supported Molybdenum Catalysts Prepared Through $Mo(\pi-C_3H_5)_4$, React. Kinet. Catal. Lett., Vol. 14, No. 2, 155-160).

SUMMARY OF THE INVENTION

The present invention relates to the preparation of highly dispersed multimetallic catalysts. Such catalysts are prepared by contacting a surface hydroxyl-containing inorganic oxide support with a metal pi-complex organometallic precursor such as molybdenum tetraallyl $(Mo(C_3H_5)_4)$. The resulting product has a uniform distribution of metal complexes which are subsequently reduced and/or sulfided to form catchment sites for subsequently added metals. Other metal pi-complex organometallic complexes, such as nickelocene $(Ni(C_5H_5)_2)$ are then attached to these catchment sites. The resulting product may then again be reduced and/or sulfided to form a catalyst of high activity.

DESCRIPTION OF SPECIFIC EMBODIMENTS

The catalysts of this invention consist of a refractory base as the carrier and two or more metal-containing components incorporated therewith. The method for the preparation of these multimetallic catalysts comprises (1) contacting a porous solid refractory inorganic oxide support having surface hydroxyl groups thereon with a non-aqueous solution. This solution contains a hydrolysis-sensitive, metal pi-complex organometallic precursor which has organic ligands. The resulting complex-containing support is reduced to remove the organic ligands from the support in order to form a catalyst containing highly dispersed metal and/or metal oxide particles. These particles serve as catchment sites for subsequently added metal complexes. The reduced support is then contacted with a non-aqueous solution containing a second metal pi-complex organometallic precursor which reacts with the catchment sites on the reduced support resulting in attachment of the second organometallic precursor to the catchment sites. The resulting loaded support is further reduced to form a multimetallic catalyst containing highly-dispersed metal and/or metal oxide particles. The catalyst may be contacted with one or more other metal pi-complex organometallic precursors. Once all the desired metals have been loaded on the substrate, the resulting catalyst can be reduced and/or presulfided to form a multimetallic catalyst containing highly dispersed metal and/or metal oxide particles.

The suitable refractory substrate materials of this invention include the oxides of metals or non-metals, such as silicon, aluminum, zirconium, magnesium, chromium, germanium, vanadium, and similar elements from Groups IIA, IIIA, IVA and B, VB, VIB, VIIB and VIII of the Periodic Table. Also, mixtures of these oxides such as silica and alumina, aluminosilicates, silica-zirconia, alumina-zirconia, and the like may be used. Alumina, e.g., both the eta elumina and gamma alumina variety, is a particularly preferred carrier.

It is necessary that any substrate employed in the present invention possesses surface hydroxyl groups (—OH). Each hydrogen atom of the —OH groups present on the substrate surface is capable of acting as a proton source, i.e., said hydroxyl group functions as an acid. In spite of this acidic activity, the substrate or matrix materials of the present invention are substantially inert because the bulk of the substrate materials are chemically inert. Particularly good examples of such inert matrix materials are silica and alumina or mixtures thereof. These comprise a matrix of silicon or aluminum and oxygen atoms, to the surface of which —OH groups are attached, the hydrogen atoms of said groups having an acidic function. However, apart fron the presence of these —OH groups, silica and alumina are generally regarded as chemically inert. The terms silica and alumina include silica and alumina based materials containing small amounts of other suitable inorganic oxides, such as magnesium oxide and zinc oxide.

It is essential that the matrix material be free of adsorbed water, which reacts with and destroys the transition metal complex. The matrix materials may be readily freed from such adsorbed water by, for example, a simple thermal treatment. In order to ensure anhydrous conditions, it may be necessary to conduct the contacting of the substrate and metal pi-complex containing solution in an inert atmosphere, i.e. argon or nitrogen.

The metal-containing components added to the carrier substrate exhibit conversion activity and are attached to the surface of the substrate in the form of a metal pi-complex organometallic material dissolved in a nonaqueous solvent. The metal pi-complexes useful in the present invention are broadly characterized by the presence of a central or nuclear metal atom having bonded thereto at least one ligand in the form of an organic group containing at least one carbon-to-carbon multiple bond. By virtue of the multiple bond, which is either a double or a triple bond, the group is bonded to the metal through the pi electrons of the bond, the resulting attachment being described as a coordinate covalent bond. The sigma electrons of the multiple bond provide a carbon-to-carbon attachment described as a covalent bond. The unsaturated organic group is preferably an unsaturated hydrocarbon group, or one derived therefrom, i.e., a substituted unsaturated hydrocarbon group, and it may have two or more of said multiple bonds. The central metal atom is preferably platinum, palladium or some other transition metal.

Optionally, the complex may also contain one or more other ligands different from said organic group and which may be either anionic or neutral, and preferably singly charged, such as a halide ion. A convenient and illustrative way of defining the useful complexes of the present invention is by means of the expression

$$R_m M X_N \qquad (I)$$

where R is the unsaturated organic group or ligand, M is the central metal atom, X is the anionic or neutral ligand described above as the "other" ligand, and m and n are integers. In some cases, X may simply be another unsaturated organic group or ligand which is different from R but selected from the same category of unsaturated organic groups.

As indicated, R is preferably an unsaturated hydrocarbon group, which may or may not be substituted by one or more substituents. Preferred unsaturated hydrocarbon groups may include olefinic ligands derived from open chain diolefins having three to 24 carbon atoms, particularly unconjugated diolefins like 1,5-dienes, and including allene, butadiene, isoprene, pentadiene, hexadiene, heptadiene, diisobutenyl, decadiene, and the like. Other preferred unsaturated hydrocarbon groups are derived from open chain olefins having more than two double bonds, some times designated oligoolefins, such as hexatriene,2,6-dimethyl-2,4,6-octatriene, etc. Also preferred are cyclic diolefins and cyclic oligo-olefins, particularly unconjugated compounds like 1,5-cyclodienes, and including cyclobutadiene, cyclopentadiene, fulvene, norbornadiene, cyclooctadiene, dicyclopentadiene, 4-vinylcyclohexene, limonene, dipentene, cycloheptatriene, cyclooctatriene, bicyclo(2.2.2)octa-2,5,7-triene, cyclonona-1,4,7-triene, cyclooctatetraene, and the like. Also useful are groups derived from heterocyclic di- and oligo-olefins like "heterocyclopentadiene," which is intended to refer to all five-membered ring systems in which a heteroatom like phosphorus, oxygen, iron, nickel, cobalt, etc., replaces a methylene group of cyclopentadiene. Other suitable unsaturated hydrocarbon groups are derived from the acetylenes such as the hexadiynes, heptadiynes, octadiynes, 1,8-nonadiyne, 4,6-decadiyne, dodecatriyne, and the like. Unsaturated hydrocarbon groups having both double and triple bonds are of value, such as butenyne, 1,6-heptadien-3-yne, 3,6-dimethyl-2,6-octadien-4-yne, 1,7-octaenyne, etc., or a mixture of an olefinic ligand and an acetylenic ligand of the foregoing types may be suitable.

It may be seen that R, the unsaturated hydrocarbon group, may have two or more double and/or triple bonds, and may have an open chain or a cyclic structure. In some cases, R may be an unsaturated cyclic or heterocyclic having one double bond, or it may be a monoolefin having two or more carbon atoms such as that derived from ethylene, styrene, and the like, or it may be a monoacetylenic acetylene group; or an aromatic ligand like benzene or phenyl. It was also indicated that R may have various substituents, and these may include alkyl, aryl, alkoxy, halogen, carboxyl, ester, keto, and the like, it being understood that, as so substituted, the resulting substituted R group is capable of pi-electron bonding to the metal atom M.

In formula (I), the atom M is a metal. Metals which can be employed are the metals of Groups VIII, IB, IVA, IVB, VB, VIB, and VIIB. The metals of Group IIIA except boron may also be employed. The metals of Group VIII are iron, cobalt, nickel, ruthenium, rhodium, palladium, osmium, iridium, and platinum. The metals of Group IB are copper, silver, and gold. The metals of Group IVA are germanium, tin, and lead, while those of Group IVB are titanium, zirconium, and hafnium. Those of Group VB are vanadium, niobium, and tantalum, and those of VIB are chromium, molybdenum, and tungsten. The metals of Group VIIB are manganese and rhenium. The metals of Group IIIA, except boron, are aluminum, gallium, indium, and thallium.

Group X of formula (I) may also be an unsaturated hydrocarbon group such as R, or a halide like $Cl^-$, $Br^-$, $F^-$, and $I^-$. Other suitable groups are alkyl, acyl, amine, ammonia, acyloxy, alkyl sulfide, aryl sulfuide, carbonyl, cyanide, isocyanide, hydrogen sulfide, nitrosyl, hydroxy, phosphine, thiocarbonyl and thionitrosyl. Also amide, aryloxy, aroyl, aroyloxy, alkoxy, hydride, hydrogen sulfite, thiocyanate, etc.

The group R in formula (I) is an anionic group if it loses a proton; and if no proton is lost, R is treated as a neutral group. In computing the oxidation number of the central metal atom, the group R if anionic, is counted as negative; if neutral, it is counted as having zero charge.

In general, it may be noted that the preferred ligands R and X are those that do not contaminate the metal surface, either because of their nature, such as alkoxy and acyloxy ligands, or because they pass off as gases, such as $Cl^-$ and $Br^-$ which pass off as HCl and HBr, or because they are converted under reaction conditions to compounds that do not contaminate, such as olefins and dienes which form saturated hydrocarbons.

The number of R and X ligands are denoted by the subscripts and n; thus may vary from 1 to 8. These variations, of course, are determined by the nature of the metal M and by its state of oxidation. The oxidation state of the metals as a group may range from 0 to 8, it being understood, as a glance at the periodic table will show, that some metals exhibit more oxidation states than others. It should be remembered that some ligands may have two bonds attached thereto. It will be seen that at least one R group is always present in formula (I). When n is 0, the formula becomes $R_m M$ where may vary from 2 to 8; in complexes of this type, M is usually a metal of Group VIII or is chosen from chromium, titanium, rhenium, or vanadium. Preferred complexes are denoted by such formulas as $R_4M$, $R_3MX$, $RMX_2$, $RMX_4$, $RMX_6$, $R_2M_2$, $R_4M_2$, $R_2MX_2$, $R_2MX_4$, and $R_2MX_6$.

Generally, and as is preferred, the useful complexes have one central or nuclear metal atom; however, the invention also contemplates complexes having two such atoms, either the same or different, as in tetraallyldimolybdenum azulenehexacarbonyldimolybdenum, $C_{10}H_8Mo_2(CO)_6$, or in 1,3-bis-(styrene)-2,4-dichloro-$\mu$-dichloro-diplatinum (II), $C_{16}H_{16}Pt_2Cl_4$, and the complex is designated a dinuclear complex.

Some illustrative complexes may be listed as follows, and an additional list appears in example 5:
1. tetraallylmolybdenum
2. nickelocene(dicyclopentadienylnickel)
3. diallyldicyclopentadienylmolybdenum
4. dicyclopentadieneplatinum(II)dichloride
5. 1,3-butadienepalladium(II)dichloride
6. 1,3,5-cycloheptatrieneplatinum(II)dichloride
7. norbornadienepalladium(II)dibromide
8. 1,3,5,7-cyclooctatetraeneplatinum(II)dichloride
9. 2,5-dimethyl-1,5-hexadieneplatinum(II)dichloride
10. bis($\pi$-allylnickel iodide)
11. 1,5-cyclooctadienegold(III)trichloride
12. (1,7-octadiyne)platinum(II)dichloride A complex like tetrallylmolybdenum, can be prepared according to the procedure of J. P. Candlin and H. Thomas, set out in Adv. Chem. Ser., 132, 212 (1974). Nickelocene, dicyclopentadienylnickel, is commercially available from Pressure Chemical Co., 3419 Smallman Street, Pittsburgh, PA 15201.

A complex like No. 4 in the foregoing list may be prepared by adding dicyclopentadiene to Zeise's acid, $H(C_2H_4PtCl_3)$, and refluxing for several hours to precipitate the complex. A complex like No. 5 may be prepared by using the method of Kharasch et al. JACS 60 882-4 (1983), as extended in Inorganic Synthesis VI 218-9, which involves using palladium(II)chloride as a starting material, reacting this with benzonitrile, and then reacting the resulting product with 1,3-butadiene. When carbonyl groups are present, as ligands, the corresponding metal carbonyl may be used as a starting compound and reacted with a suitable olefinic material. Other methods for preparing the complexes are available.

In order to produce the multimetallic catalysts of the present invention, a substrate material is contacted with the desired complex, e.g. tetraallylmolybdenum, suitably dissolved in a nonaqueous solvent for a period of time sufficient to permit attachment of the complex to the substrate, say about 0.1 to 24 hours. Reduction of the complex may be effected by separating the resulting solid from the nonaqueous solvent and exposing it to a reducing gas such as hydrogen at temperatures ranging from about 25° to 600° C., and pressures ranging from about 1 psi to 1000 psi. Alternatively, the reduction can be accomplished in situ by bubbling hydrogen gas through the non-aqueous solvent and a metal complex containing another desired metal, e.g. nickelocene. The nonaqueous solvent is removed and the resulting metal-loaded solid may be presulfided by treatment with $H_2S$ under the following conditions: 200°–400° C., 1–20 psi. Alternatively, the metal-loaded solid may be reduced by treatment with hydrogen and then subsequently contacted with a third metal-complex solution. The resulting trimetallic catalyst may then be presulfided by contacting it with hydrogen sulfide as reduced and contacted with yet another metal-complex solution, and so on.

Suitable nonaqueous solvents include alkanes like pentane; aromatics like benzene (preferably thiophene-free) and toluene; halogenated alkanes and aromatics like trichloroethane, chlorobenzene, chloroform, and carbon tetrachloride; esters like methyl and ethyl acetates; ethers like dioxane and diethyl ether, ketones like acetone and methyl ethyl ketone. Also contemplated are nitroalkanes. Other things being the same, a more volatile solvent is to be chosen as against a less volatile one in order to facilitate its removal at the end of the deposition step.

Hydrogen is the preferred reducing agent as it is not only effective but, being gaseous, does not remain in the reaction mixture during in situ reduction. Other agents that may be used include formic acid, and alkali metal hydrides and borohydrides. Also dibenzyl, hydrazobenzene, hydroquinone, and various hydroaromatics, like cyclohexene, tetralin, 2-cyclohexene-1-one, 4-vinylcyclohexene, cyclohexadiene, and other partially saturated cycloalkenes; also p-menthadienes such as limonene, the terpenes, etc., also 1,4dihydro-N-benzylnicotinamide.

In other cases, the unsaturated hydrocarbon group, R in formula (I), may act as the reducing agent for decomposing the complex, as frequently R is a hydroaromatic moiety. Thus, in order to decompose the complex, it is heated in the presence of the solvent, and the substrate, thus depositing free metal on the substrate. The ligand X, if it is group like $Cl^-$, may react to form HCl, which under the reaction conditions can leave the reaction mixtures as a gaseous product.

The substrate may be any suitable solid porous or non-porous material which provides a catalytic surface capable of influencing deposition of the metal and which, of course, is insoluble in the solution of the complex. It may have any suitable shape, ranging from a powdered or granular material to larger objects, including screens and sheet material.

The invention may be illustrated by the following examples.

EXAMPLE 1

Catalyst A

Under Ar atmosphere 0.94 g of molybdenumtetrallyl $[Mo(C_3H_5)_4]$ in 40 ml of degassed pentane was added to 8.27 g of alumina (Davision Chemical, surface area 255 $M^2/g$ 20–40 mesh size, precalcined at 500° C. for 16 hours). The mixture was kept at 0° for 16 hours. After pentane was removed under vacuum for 3 hours, the remaining solid was treated with 100 cc/min of $H_2$ at 600° C. for 16 hours. 0.17 g of nickelocene $[Ni(C_5H_5)_2]$ in 15 ml of pentane was then added under Ar to 1.97 g of these solids. Pentane was then removed after an immersion period of 1 hour at 25° C. The resultant solid contained 3.71% of Mo and 1.91% of Ni by weight. Presulfide was accomplished by treatment with 100 cc/min of $H_2S$ at 400° C. for 3 hours.

EXAMPLE 2

Catalyst B

Under Ar atmosphere, 0.51 g of molybdenumtetraallyl in 25 ml of degassed pentane was added to 4.81 g of the same alumina support used in Example 1 and kept at 0° for 16 hours. 0.35 g of nickelocene in 35 ml of pentane solution was added to this mixture and maintained at room temperature for 1 hour. After pentane was removed under vacuum for 2 hours, the solid was treated with 100 cc/min of $H_2$ at 500° C. for 4 hours. The resultant solid contained 3.64% of Mo and 1.85% of Ni by weight. It was subsequently treated with 100 cc/min of $H_2S$ at 400° C. for 3 hours.

EXAMPLE 3

Catalyst C

Catalyst C was prepared by following the procedure set out in Example I, except that only 0.36 g of molybdenumtetraallyl and 0.74 g of nickelocene were used in order to reduce the metals loading to 1.5 wt% Mo and 2.6 wt% Ni. Presulfiding was effected by contacting the loaded catalyst with hydrogen sulfide while raising the temperature conditions from room temperature to 400° C. at a rate of 5° C./minute and holding thereat for 3 hours.

EXAMPLE 4

Catalyst D

Catalyst D, a conventionally loaded analogue of catalyst C, was prepared by stepwise impregnation of inorganic salts in aqueous solution. The gamma alumina substrate was contacted first with aqueous ammonium paramolybdate $[(NH_4)_6MO_7O_{24}]$ and then with nickel nitrate $[Ni(NO_3)_2]$. The resulting metal-loaded catalyst material was presulfided before using by contact with 2% $H_2S/H_2$ during which time the temperature was increased from room temperature to 200° C. to 400° C. at a rate of 2° C./min and maintained at 400° C. for 2 hours.

EXAMPLE 5

Hydrogenation of Condensed Aromatic Compounds

The relative catalytic activity of the above catalysts were measured for the hydrogenation of mixtures of condensed aromatic compounds. A standard commercial Mo-Co hydrotreating catalyst, HDS 1442 available from American Cyanamide and having a surface area of 311 $m^2/g$ and an average pore diameter of 61 angstroms was also compared. The commercial catalyst was presulfided with 10% $H_2S/H_2$ gas at 400° C. for 2 hours.

Reactions were carried out in a downflow trickle-bed reactor. The composition of the condensed aromatic compound feed was as follows: thiophene, 1 wt%; mesitylene, 69 wt%; naphthalene 10 wt%; phenanthrene, 10 wt%; and pyrene, 10 wt%. Reaction conditions maintained during hydrogenation included a temperature of 343° C., 1400 psig $H_2$, and a $H_2$/feed volume ratio of 1000. The percentage of hydrogenation is defined as the (average number of added hydrogen)/(the number of hydrogens necessary to completely hydrogenate the aromatic compound)×100%. For example, fourteen hydrogens are required to convert phenanthrene to perhydrophenanthrene which is 100% hydrogenated. Thus, 9,10-dihydrophenanthrene is 2/14 (14.3%) hydrogenated. As an approximation, a mixture of hydroderivatives of phenanthrene containing, on an average, two hydrogens added is also considered 14.3% hydrogenated. Table 1 indicates the percent of hydrogenation for three runs made at LHSVs of 4, 10 and 14. The percent of hydrogenation was calculated from product distributions obtained from gas chromatographic analyses.

The results of these runs show that the catalyst preparation techniques of the present invention produce considerable improvements in catalyst activity over inorganic salt impregnation methods. This is evidenced by comparison of the runs employing catalysts C and D. Furthermore, catalysts A, B, and C outperformed the HDS 1442 catalyst even though the former contain lesser amounts of molybdenum.

EXAMPLE 6

Hydrotreating of Paraho Shale Oil

Catalyst A was compared with commercial Shell 324 catalyst having a Mo content of 13.7 wt. percent and a Ni content of 2.7% in the hydrotreating of a Paraho shale oil. As shown below in Table 2, the hydrogen to carbon ratio of the hydrotreated feed of Catalyst A compared favorably with that of the commercially prepared catalyst despite catalyst A's lower metals content. Iron and arsenic levels of the catalyst A product were found to be significantly lower than the commercial catalyst-treated product.

TABLE 1

COMPARISON OF CATALYST HYDROGENATION ACTIVITY FOR POLYCONDENSED AROMATICS
(REACTION CONDITIONS: 650° F. 1400 psig $H_2$, $H_2$/FEED VOLUME RATIO = 1000)

| | Hydrogenation (%) | | | | | | | | | Metal Content (% by weight) | | | |
|---|---|---|---|---|---|---|---|---|---|---|---|---|---|
| | Naphthalene LHSV | | | Phenanthrene LHSV | | | Pyrene LHSV | | | | | | Preparation |
| Catalyst | 4 | 10 | 14 | 4 | 10 | 14 | 4 | 10 | 14 | Mo | Ni | Co | Method |
| A | 22.8 | 10.8 | 8.0 | 22.9 | 11.8 | 10.3 | 25.7 | 16.8 | 16.1 | 3.7 | 1.9 | — | Organometallic Precursor |
| B | 25.4 | 11.6 | 8.4 | 26.0 | 13.6 | 10.5 | 27.0 | 17.8 | 17.1 | 3.6 | 1.9 | — | Organometallic Precursor |
| C | 16.9 | 7.2 | 5.0 | 19.0 | 9.6 | 5.8 | 19.5 | 12.2 | 9.5 | 1.5 | 2.6 | — | Organometallic Precursor |
| D | 6.8 | 2.5 | 1.6 | 8.1 | 3.5 | 2.2 | 12.7 | 7.0 | 5.1 | 1.5 | 2.6 | — | Inorganic Salt Impregnation |
| HDS 1442 | 18.9 | 8.4 | 6.1 | 13.7 | 6.4 | 5.2 | 12.9 | 7.9 | 7.0 | 9.8 | — | 2.6 | Commercial |

TABLE 2

HYDROTREATING OF PARAHO SHALE OIL

Reaction condition: 700° F. 1400 psig H$_2$, H$_2$/Feedstock 5600 SCF/barrel WHSV 4.3

| Catalyst | Day on Stream | H/C | S (%) | N (%) | Basic N (%) | Fe (ppm) | As (ppm) | Diene Number |
|---|---|---|---|---|---|---|---|---|
| Feedstock | 0 | 1.665 | 0.920 | 2.18 | 2.18 | 28 | 32.0 | 35 |
| Catalyst A Mo 3.7% Ni 1.9% | 1 | 1.764 | 0.137 | 1.83 | 1.17 | 24 | 1.88 | 25 |
|  | 2 | 1.774 | 0.077 | 1.86 | 1.23 | 7.4 | 0.58 | 20 |
|  | 3 | 1.762 | 0.083 | 1.87 | 1.26 | 8.0 | 0.83 | 22 |
| Shell 324 Mo 13.7% Ni 2.7% | 1 | 1.764 | 0.170 | 1.79 | 1.12 | 29 | 3.90 | 23 |
|  | 2 | 1.778 | 0.097 | 1.81 | 1.30 | 16 | 3.32 | 23 |
|  | 3 | 1.765 | 0.073 | 1.89 | 1.30 | 15 | 1.21 | 24 |

What is claimed is:

1. A method for the preparation of multimetallic catalysts which comprises (1) contacting a porous solid refractory inorganic oxide support having suface hydroxyl groups thereon with a non-aqueous solution containing a hydrolysis-sensitive, metal pi-complex organometallic precursor which contains organic ligands, and reducing the resulting complex-containing support to remove said organic ligands therefrom to form a catalyst containing highly dispersed metal and/or metal oxide particles which serve as catchment sites for subsequently added metal complexes; (2) contacting said reduced support with a non-aqueous solution containing a second metal pi-complex organometallic precursor which reacts with the catchment sites on the reduced support causing attachment of the second organometallic precursor thereto, and reducing the resulting loaded support to form a multimetallic catalyst containing highly dispersed metal and/or metal oxide particles; (3) contacting the resulting catalyst with one or more other metal pi-complex organometallic precursors and reducing the resulting catalyst and (4) activating the resulting catalyst by presulfiding to form a multimetallic catalyst containing highly dispersed metal and/or metal oxide particles.

2. A method for the preparation of multimetallic catalysts which comprises (1) contacting a porous solid refractory inorganic oxide support with a non-aqueous solution containing at least two metal pi-complex organometallic precursors containing organic ligands; (2) reducing the resulting complex-containing support to remove said organic ligands therefrom, to form a catalyst containing highly dispersed metal and/or metal oxide particles which serve as catchment sites for other metal complexes and (3) activating the resulting catalyst by presulfiding.

3. A method for the preparation of bimetallic hydrogenation catalyst which comprises (1) contacting an inorganic oxide support which contains surface hydroxyl groups, with a metal pi-complex organometallic precursor containing organic ligands wherein said metal is selected from the group consisting of Group VIB and Group VIII metals; (2) reducing the resulting complex-containing support to remove said organic ligands therefrom to form a catalyst containing highly dispersed metal and/or metal oxide particles which serve as metal catchment sites; (3) contacting said reduced support with another metal pi-complex organometallic precursor containing organic ligands wherein said metal is selected from the group consisting of Group VIB and Group VIII metals, whereby said precursor is attached to said catchment sites to form a bimetallic catalyst containing well-dispersed metals.

4. A method for the preparation of bimetallic hydrogenation catalyst which comprises (1) contacting an inorganic oxide support which contains surface hydroxyl groups with a Group VIB metal pi-complex organometallic precursor containing organic ligands; (2) reducing the resulting complex-containing support to remove said organic ligands therefrom to form a catalyst containing highly dispersed metal particles which serve as metal catchment sites; (3) contacting said reduced support with a Group VIII metal pi-complex organometallic precursor containing organic ligands whereby said precursor is attached to said catchment sites to form a bimetallic catalyst containing highly dispersed metals.

5. The method of claim 4 wherein said Group VIB metal pi-complex organometallic precursor is molybdenum tetraallyl and said Group VIII metal pi-complex organometallic precursor is nickelocene.

6. The method of claim 3 wherein said bimetallic catalyst containing highly dispersed metals is reduced and then activated by pre-sulfiding.

7. The method of claim 3 wherein said bimetallic catalyst containing highly dispersed metal is activated by pre-sulfiding.

8. The method of claim 3 wherein said inorganic metal oxide support is selected from the group consisting of silica, alumina and silica-alumina.

9. A method for the preparation of multimetallic catalysts which comprises (1) contacting a porous solid refractory inorganic oxide support having surface hydroxyl groups thereon with a non-aqueous solution containing a hydrolysis-sensitive, metal pi-complex organometallic precursor which contains organic ligands, and reducing the resulting complex-containing support to remove said organic ligands therefrom to form a catalyst containing highly dispersed metal and/or metal oxide particles which serve as catchment sites for subsequently added metal complexes; (2) contacting said reducing support with a non-aqueous solution containing a second metal pi-complex organometallic presursor which reacts with the catchment sites on the reduced support causing attachment of the second organometallic precursor thereto, and reducing the resulting loaded support to form a multimetallic catalyst containing highly dispersed metal and/or metal oxide particles; and (3) activating the resulting catalyst by presulfiding to form a multimetallic catalyst containing highly dispersed metal and/or metal oxide particles.

* * * * *

UNITED STATES PATENT AND TRADEMARK OFFICE
CERTIFICATE OF CORRECTION

PATENT NO. : 4,513,098
DATED : April 23, 1985
INVENTOR(S) : Ying-Yen Tsao

It is certified that error appears in the above-identified patent and that said Letters Patent is hereby corrected as shown below:

Col. 5, line 40, "(1983)" should be --(1938)--.

Col. 9, line 20, "suface" should be --surface--.

*Signed and Sealed this*

*Fifteenth* Day of *October 1985*

[SEAL]

*Attest:*

DONALD J. QUIGG

*Attesting Officer*

*Commissioner of Patents and Trademarks—Designate*